(12) United States Patent
Atcha

(10) Patent No.: US 8,607,338 B2
(45) Date of Patent: Dec. 10, 2013

(54) MALICIOUS ADVERTISEMENT MANAGEMENT

(75) Inventor: Faizal Atcha, Woodbridge, NJ (US)

(73) Assignee: Yahoo! Inc., Sunnyvale, CA (US)

( * ) Notice: Subject to any disclaimer, the term of this patent is extended or adjusted under 35 U.S.C. 154(b) by 786 days.

(21) Appl. No.: 12/535,514

(22) Filed: Aug. 4, 2009

(65) Prior Publication Data

US 2011/0035800 A1 Feb. 10, 2011

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .............................................. 726/22; 726/23

(58) Field of Classification Search
USPC ....................................................... 726/22, 23
See application file for complete search history.

(56) References Cited

U.S. PATENT DOCUMENTS

2005/0283836 A1* 12/2005 Lalonde et al. ................ 726/24
2008/0243602 A1 10/2008 Foti
2009/0055651 A1* 2/2009 Girod et al. .................... 713/176
2009/0094175 A1 4/2009 Provos et al.
2009/0094697 A1* 4/2009 Provos et al. .................... 726/23
2009/0287653 A1* 11/2009 Bennett ............................. 707/3
2009/0327084 A1 12/2009 Patton et al.
2009/0327849 A1* 12/2009 Kavanagh et al. ............. 715/205
2010/0037305 A1* 2/2010 Griffith et al. .................... 726/7
2010/0235831 A1* 9/2010 Dittmer ............................ 718/1
2010/0250397 A1* 9/2010 Ippolito ......................... 705/27
2010/0281083 A1* 11/2010 Purtell et al. .................. 707/822
2011/0047618 A1* 2/2011 Evans et al. .................... 726/23

OTHER PUBLICATIONS

U.S. Appl. No. 12/699,402, filed Feb. 3, 2010, Faizal Atcha.

* cited by examiner

*Primary Examiner* — Kambiz Zand
*Assistant Examiner* — Benjamin Kaplan
(74) *Attorney, Agent, or Firm* — Mauriel Kapouytian Woods LLP

(57) ABSTRACT

Methods and systems are provided for managing malicious advertisements, including threats or risks posed by malicious advertisements or potentially malicious or risky advertisements. Methods are provided in which an advertisement is tested to determine behavioral characteristics at a non-active time and at an active time, and the two sets of characteristics are compared. If a difference is determined to exist, an action is taken that reflects a higher chance of the advertisement being malicious than if no difference was detected. Furthermore, the characteristics at a non-active time may be used in determining a degree of risk associated with an advertisement.

20 Claims, 4 Drawing Sheets

MALICIOUS ADVERTISEMENT MANAGEMENT

BACKGROUND

Malicious online advertisements continue to present problems, including problems for advertising networks, such as Web portals including search engines and search engine providers, as well as for users who receive the advertisements. In a process often known as editorial, advertising networks, or other responsible or involved entities, often perform checks to try to ensure that advertisements are safe. These checks may include automated or human checks, or a combination thereof. The checks are often preformed prior to the advertisements going "live", or being available for serving to users. Designers of malicious advertisements, however, are motivated and skilled at creating malicious advertisements that are difficult to detect.

Additionally, factors such as sophisticated, constantly evolving, and rapidly changing technologies provide ongoing new opportunities for creative designers of malicious advertisements. This can make it very difficult to keep ahead of and detect malicious advertisements. As just one of many examples, malicious advertisements have cropped up that behave normally for a period of time, but are set to, or can be triggered to, change their behavior at a later time. Such advertisements may pass editorial in their initial form, but may essentially morph into something different and dangerous, or may change their behavior and behave maliciously, at a later time, which may be during active serving. Some such advertisements may even change back and forth from a non-malicious state to a malicious state multiple times, further confounding detection efforts.

There is a need for methods and systems for managing malicious advertisements, including threats or risks posed by malicious advertisements and potentially malicious or risky advertisements.

SUMMARY

Some embodiments of the invention provide methods and systems for managing malicious advertisements, including threats or risks posed by malicious advertisements or potentially malicious or risky advertisements. Methods are provided in which an advertisement is tested to determine behavioral characteristics at a non-active time and at an active time, and the two sets of characteristics are compared. If a difference is determined to exist, an action is taken that reflects a higher chance of the advertisement being malicious than if no difference was detected.

In some embodiments, the nature, type, or degree of difference is considered in determining the degree of risk that the advertisement is malicious or in determining an action to take with respect to managing the risk.

In some embodiments, if a difference is determined to exist, the advertisement will be terminated from being active, or will be suspended from being active until testing is performed to provide further information regarding whether the advertisement may be malicious. Testing can involve conduct such as isolation, simulation, analysis, debugging, and other conduct. In some embodiments, testing can include sampling the advertisement at an active time, and performing simulation or testing on the sampled advertisement. The testing can include running the advertisement on a virtual machine, or in a sandbox environment, to allow gathering of further information regarding the advertisement.

Furthermore, in some embodiments, a set of behavioral characteristics associated with the advertisement at a non-active time, such as prior to being available for serving, may be used in determining a level of risk associated with an advertisement. Riskier advertisements may later be subjected to a higher degree of scrutiny with respect to being malicious, which can include, for example, more frequent or more intense testing at times at which the advertisement is active. Other factors directly or indirectly associated with the advertisement may also be included in making the determination, including, for example, the reliability, track record, or reputation of the advertisement or the advertisement provider.

While the invention is described with reference to the above drawings, the drawings are intended to be illustrative, and the invention contemplates other embodiments within the spirit of the invention.

DETAILED DESCRIPTION

In some embodiments, the invention provides methods and systems for managing malicious advertisements, including threats or risks posed by malicious advertisements or potentially malicious or risky advertisements. Methods are provided in which an advertisement is tested to determine behavioral characteristics at a non-active time and at an active time, and the two sets of characteristics are compared. If a difference is determined to exist, an action is taken that reflects a higher chance of the advertisement being malicious than if no difference was detected. In some embodiments, testing may be preformed repetitively or periodically when the advertisement is in an active mode.

In some embodiments, the nature, type, or degree of difference is considered in determining a degree of risk that the advertisement is malicious or in determining an action to take with respect to managing the risk.

In some embodiments, if a difference is determined to exist, the advertisement will be terminated from being active, or will be suspended from being active until testing is preformed to provide further information regarding whether the advertisement may be malicious. In some embodiments, testing can include sampling the advertisement at an active time, and performing simulation or testing on the sampled advertisement. The testing can include running the advertisement on a virtual machine, or in a sandbox environment, to allow gathering of further information regarding the advertisement. Depending on the results, appropriate action may be taken, which may include suspension or termination of the advertisement if the risk is determined to be sufficiently high, reinstating the advertisement if the risk is determined to be sufficiently low, or performing further testing if determined to be necessary or appropriate.

Figure 1:
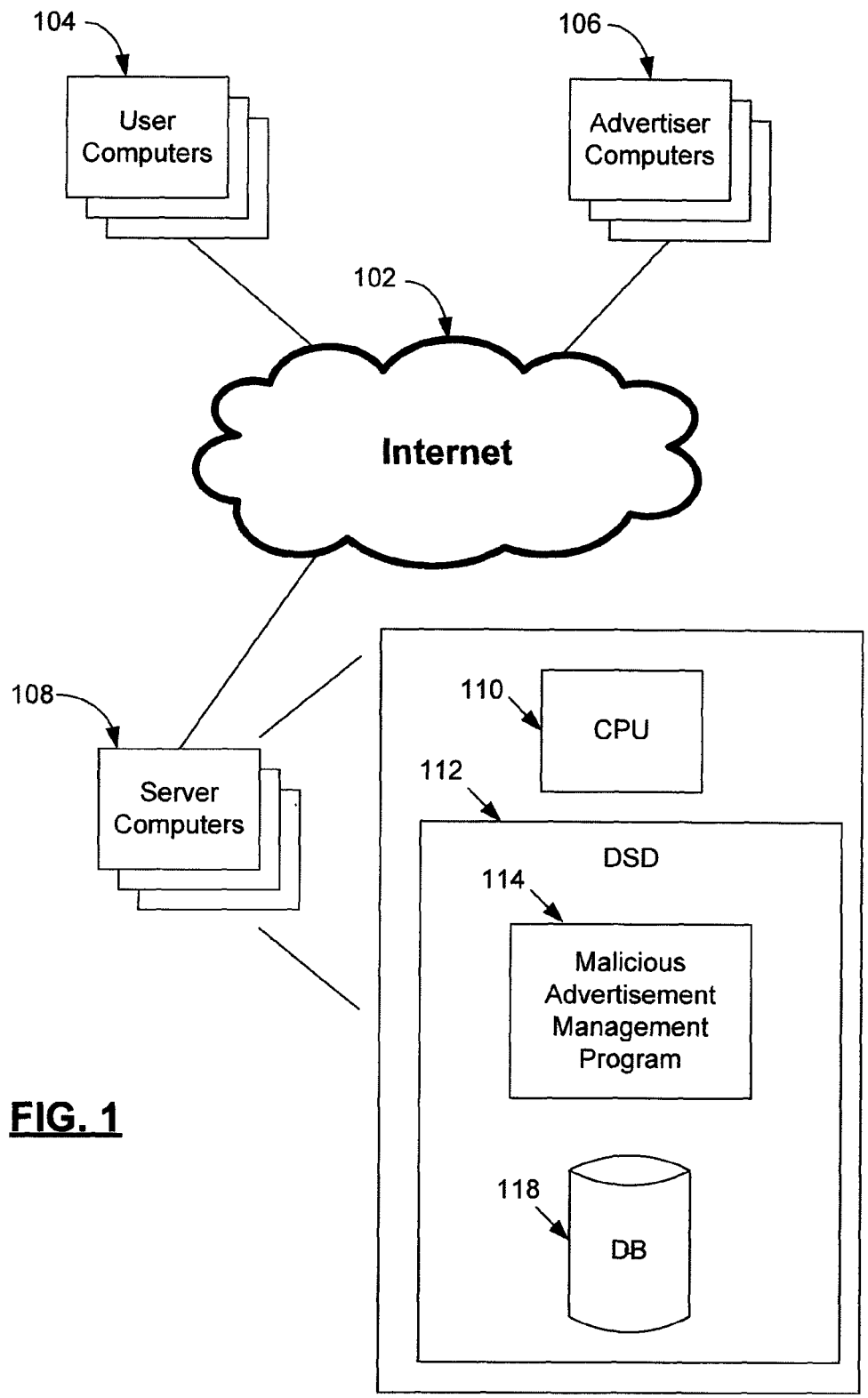
FIG. 1 is a distributed computer system according to one embodiment of the invention.

FIG. 1 is a distributed computer system 100 according to one embodiment of the invention. The system 100 includes user computers 104, advertiser computers 106 and server computers 108 connected or connectable to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include a wireless, portable, or handheld devices such as cell phones, PDAs, etc.

Each of the one or more computers 104, 106, 108 may be distributed, and can include various hardware, software, applications, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, and software to enable searching, search results, and advertising, such as keyword searching and advertising in a sponsored search context. As depicted, each of the server computers 108 includes one or more CPUs 110 and a data storage device 112.

The data storage device 112 includes one or more databases 118, as well a malicious advertisement management program 114.

The malicious advertisement management program 114 is intended to broadly include programming, algorithms, applications, software, graphical user interfaces, models, and other tools or procedures necessary to implement or facilitate methods and systems according to embodiments of the invention, or computerized aspects thereof, whether on one computer or distributed among multiple computers or devices. In various embodiments, the elements of the advertisement management program 114 may exist on one computer, or may exist on multiple computers, devices, or locations.

In some embodiments, the server computers 108 may be part of an advertisement exchange. For example, some Web portals operate, utilize, or facilitate advertising exchanges. Such exchanges may virtually connect parties including advertisers, publishers, networks of advertisers, networks of publishers, and other entities. The exchange may facilitate arrangements, bidding, auctioning in connection with advertisements and advertisement campaigns, and may also facilitate planning and serving of advertisements. Advertisements that may be included within the exchange can include display or graphical advertisements that are not served in connection with user searches including keyword-based searches. The exchange may also include sponsored search advertisements, including advertisements served in association with user searches, such as keyword searches. Any type of simple or sophisticated advertisements may be included, such as picture, video and audio advertisements, streaming advertisements, interactive advertisements, rich media advertisements, etc.

In some embodiments, active advertisements are advertisements that are available for serving on or in connection with the exchange, whereas non-active advertisements are not so available. For example, non-active advertisements can include advertisements that are in review prior to be available for serving. This can include review as part of an editorial process to try to ensure or reduce the chance that inappropriate or dangerous advertisements are not allowed to be active.

Figure 2:
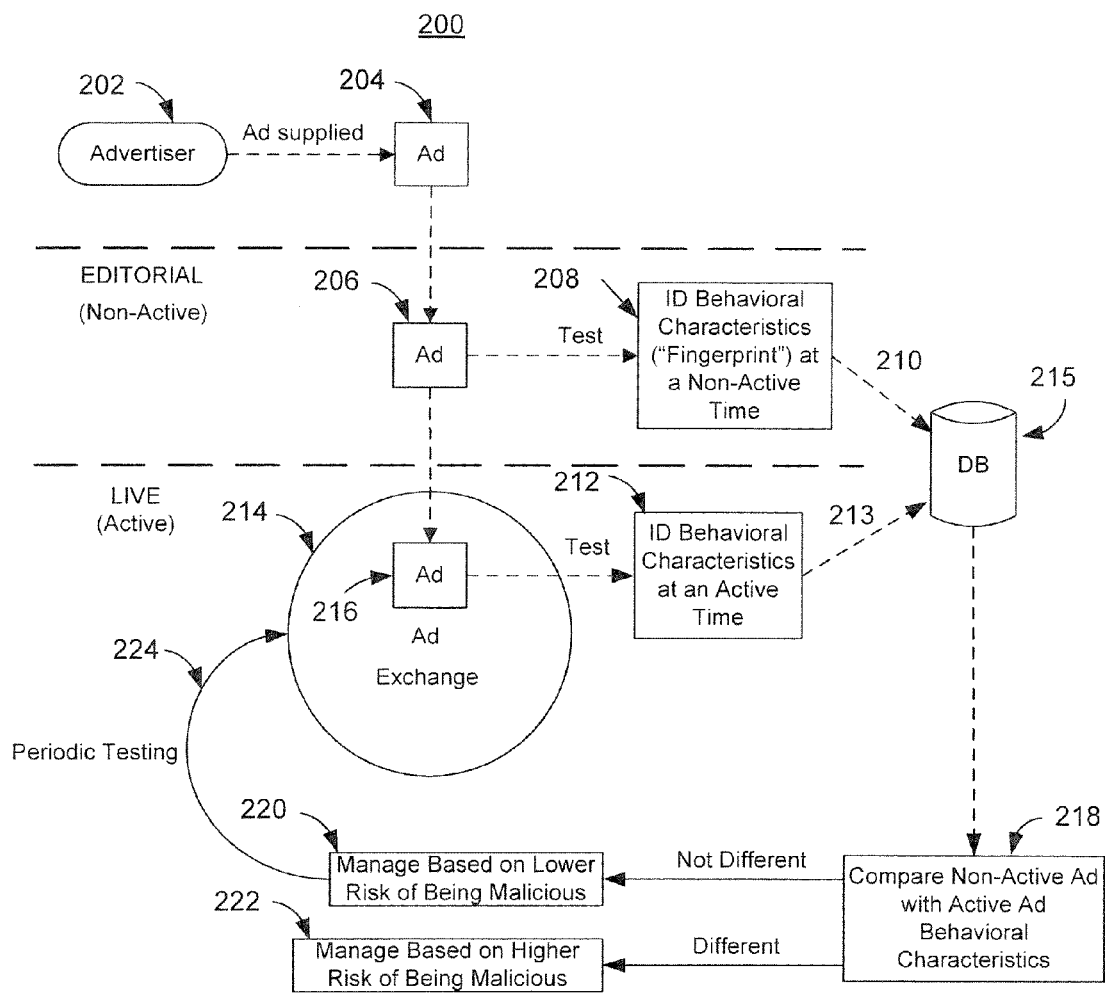
FIG. 2 is a conceptual block diagram illustrating one embodiment of the invention.

FIG. 2 is a conceptual block diagram 200 illustrating one embodiment of the invention. Block 202 represents a party that supplies an advertisement, represented by block 204, intended for eventually being available for serving to users through an advertisement network. Block 202 can be, for example, an advertiser, or a party acting on behalf or at least partially in the role of, an advertiser. Block 202 represents an advertisement supplied by the advertiser or other entity. Herein, the term "advertisement" is intended to broadly include all code, programming, software, or the like, that can be considered to be part of or an aspect of the advertisement.

Block 206 represents the advertisement after it enters an editorial process, which may be conducted by an advertisement network or partner thereof. Generally, the editorial process takes place prior to the advertisement becoming active, or available for serving.

As part of an editorial process according to some embodiments of the invention, the advertisement may be tested to determine behavioral characteristics associated with it. For example, such characteristics can include a tendency or ability to engage in particular actions or types of actions. Such characteristics or actions can include, for example, accessing resources or types of resources, modifying, adding, deleting, moving, inserting, or injecting anything on a system such as an ad exchange, user computer, or other computer, downloading or uploading files, causing navigational changes or redirects, allowing or providing access by another resource or computer, storing information, and many other possible activities or conduct or potential conduct.

In some embodiments, block 208 can include establishing, based at least in part on determined behavioral characteristics of the advertisement as determined in a non-active mode, a behavioral "fingerprint". The behavioral fingerprint can provide a baseline behavioral characteristic pattern for the advertisement at a non-active time. Arrow 210 represents storing of behavioral characteristic information, which may include the fingerprint, such as in a database 215.

In some embodiments, the non-active advertisement behavioral fingerprint may be used in assessing, estimating, or determining a degree of risk associated with the advertisement, such as a degree of risk that the advertisement may be malicious. For example, certain characteristics, or combinations or characteristics, may be associated with a greater chance that the advertisement may be malicious, even if it is not clear at that time that the advertisement is actually malicious. In some embodiments, the degree or level of risk may be used in determining or gauging other activities associated with managing the risk, or identifying the advertisement as malicious. For example, a higher degree of risk may indicate, lead to or make appropriate a greater degree of scrutiny after the advertisement has gone active, such as an increased frequency of testing, more or different testing, or intense testing. A sufficiently risky fingerprint may in some cases alone lead to not allowing the advertisement to become active at all, or not allowing the advertisement to become active until after further testing and clearance.

Block 216 represents the advertisement after it has gone into an active mode, and is available for serving to users, such as after it has passed or been cleared through an editorial process. Active mode can include the advertisement being available to or within an advertisement exchange. Such as advertisement exchange is depicted as circle 214.

In some embodiments, after the advertisement 216 is active and available to the advertisement exchange 214, the advertisement 216 is tested, or sampled and tested, and its behavioral characteristics are determined, as represented by block 212. The set of characteristics so determined may then be stored, such as in the database 215, as indicated by arrow 213.

Block 218 represents comparison of the set two sets of behavioral characteristics, one set determined when the advertisement is non-active, and the other set determined when the advertisement is active.

Generally, advertisements whose behavioral characteristics change may pose a greater risk of being malicious. As represented at block 220, if the two sets are not different, then the advertisement is managed based on a lower level of risk, whereas, as represented by block 222, if they are different, then the advertisement is managed based on a higher level risk.

In some embodiments, periodic or repetitive testing is performed on active advertisements, as indicated, for example, by arrow 224. For example, in some embodiments, periodically, while the advertisement is active, the advertisement is sampled from the ad exchange 214, tested, and its set of behavioral characteristics are compared with that of the advertisement at a non-active time. In some embodiments, this process is repeated periodically, until and unless a change is detected, at which time conduct may be undertaken that reflects a determination that there is an increased chance that the advertisement is malicious.

In some embodiments, active advertisements may be sampled and tested periodically, and their determined behavioral characteristics compared with those of the advertisement as determined when the advertisement was in a non-active state. In some embodiments, the nature, frequency or intensity of testing is based at least in part on a risk assessment associated with the set of characteristics determined when the advertisement was in a non-active state.

If a change is detected, this can be an indication of a malicious advertisement or risk thereof. When or after a change is detected, appropriate action may be taken, such as removing the advertisement from an active state permanently or until further testing and assessment can be performed. In some embodiments, testing or other action that is taken may vary according to the nature, degree, number, or specific set, combination or pattern of differences. Testing can broadly include any of a number of activities, including activities that may shed light on the nature of the advertisement, its risk or likelihood of being malicious, whether or not it actually is malicious, or exactly what it may do, how it may do it, or the specifics or details associated with such activities, that may be considered malicious. For example, testing may include analysis or simulation of serving to a user computer, such as running the advertisement on a virtual machine, or in a sandbox environment, such as to assess, understand, and record its behavior in a controlled, safe, easy to analyze, efficient and controllably variable set of circumstances.

Figure 3:
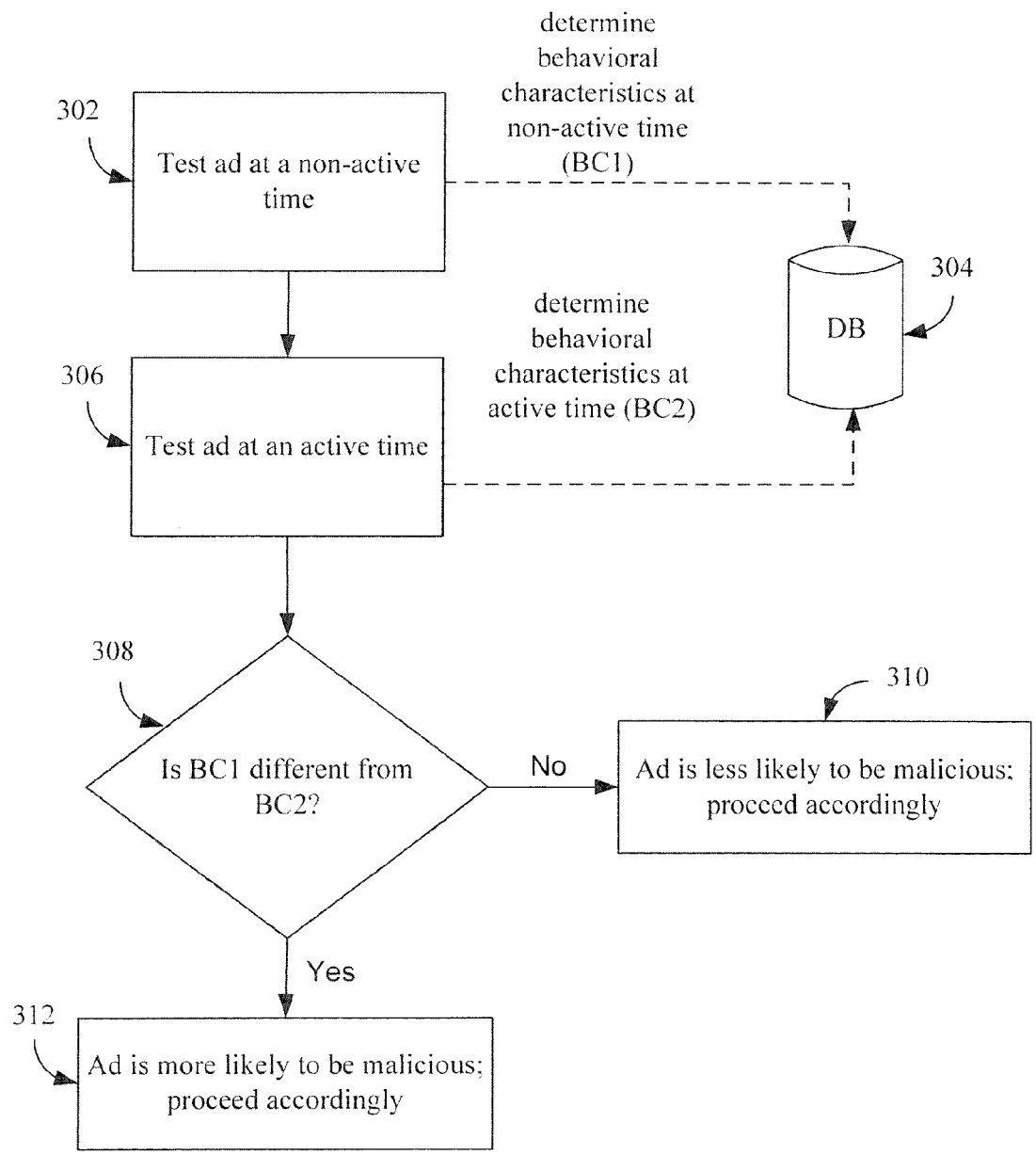
FIG. 3 is a flow diagram of a method according to one embodiment of the invention.

FIG. 3 is a flow diagram of a method 300 according to one embodiment of the invention. At step 302, the advertisement is tested at a non-active time, and behavioral characteristics of the advertisement are determined and stored in a database 304.

Next, at step 306, the advertisement is tested at an active time, and behavioral characteristics of the advertisement are determined and stored in a database 304 or another database or other storage.

Next, at step 308, it is queried whether the characteristics of the advertisement determined when the advertisement was non-active differ from the characteristics of the advertisement determined when the advertisement was active.

At step 310, if it is determined that there is not a difference, then it is considered that the advertisement is less likely to be malicious, and conduct proceeds accordingly. For example, the advertisement may be allowed to remain active without follow-on testing or immediate follow-on testing.

At step 312, if it is determined that there is a difference, then it is considered that the advertisement is more likely to be malicious, and conduct proceeds accordingly. For example, the advertisement may be removed from being active, or may be subject to further testing or more frequent or intense testing.

Figure 4:
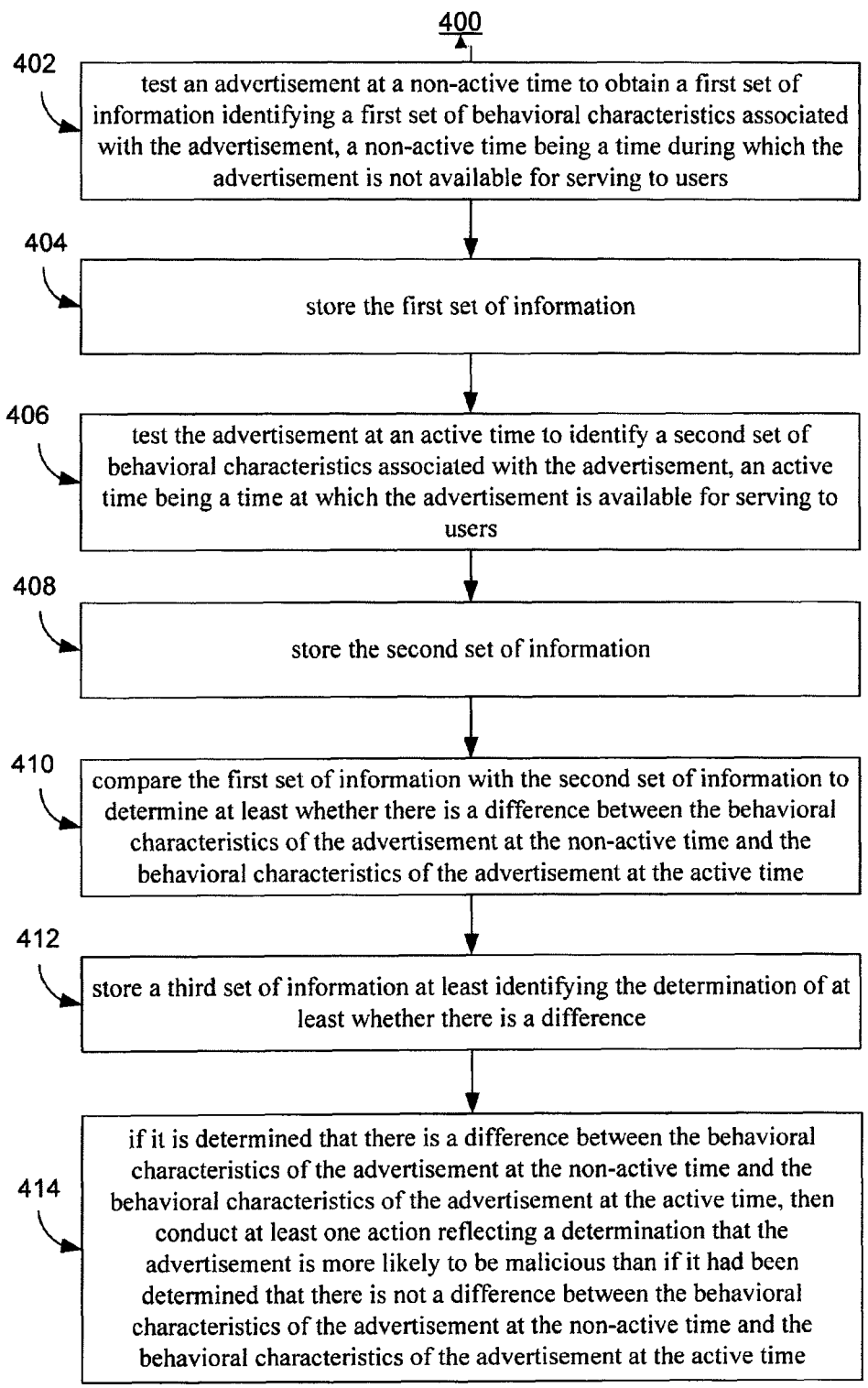
FIG. 4 is a flow diagram of a method according to one embodiment of the invention.

FIG. 4 is a flow diagram of a method 400 according to one embodiment of the invention. At step 402, an advertisement is tested at a non-active time to obtain a first set of information identifying a first set of behavioral characteristics associated with the advertisement, a non-active time being a time during which the advertisement is not available for serving to users.

Next, at step 404, the first set of information is stored, such as in a database.

Next, at step 406, the advertisement is tested at an active time to identify a second set of behavioral characteristics associated with the advertisement, an active time being a time at which the advertisement is available for serving to users.

Next, at step 408, the second set of information is stored, such as in a database.

Next, at step 410, the first set of information is compared with the second set of information to determine at least whether there is a difference between the behavioral characteristics of the advertisement at the non-active time and the behavioral characteristics of the advertisement at the active time.

Next, at step 412, a third set of information is stored at least identifying the determination of at least whether there is a difference.

Finally, at step 414, if it is determined that there is a difference between the behavioral characteristics of the advertisement at the non-active time and the behavioral characteristics of the advertisement at the active time, then at least one action is conducted reflecting a determination that the advertisement is more likely to be malicious than if it had been determined that there is not a difference between the behavioral characteristics of the advertisement at the non-active time and the behavioral characteristics of the advertisement at the active time.

The foregoing description is intended merely to be illustrative, and other embodiments are contemplated within the spirit of the invention.

What is claimed is:
1. A method comprising:
using one or more computers, testing an advertisement at a non-active time to obtain a first set of information identifying a first set of behavioral characteristics associated with the advertisement, a non-active time being a time at which the advertisement is not available for serving to users;
using one or more computers, storing the first set of information;
using one or more computers, testing the advertisement at an active time to obtain a second set of information identifying a second set of behavioral characteristics associated with the advertisement, an active time being a time at which the advertisement is available for serving to users;
using one or more computers, storing the second set of information;
using one or more computers, comparing the first set of information with the second set of information to determine at least whether there is a difference between the behavioral characteristics of the advertisement at the non-active time and the behavioral characteristics of the advertisement at the active time;
using one or more computers, storing a third set of information at least identifying the determination of at least whether there is a difference; and using one or more computers, if it is determined that there is a difference between the behavioral characteristics of the advertisement at the non-active time and the behavioral characteristics of the advertisement at the active time, then conducting at least one action reflecting a determination that the advertisement is more likely to be malicious than if it had been determined that there is not a difference between the behavioral characteristics of the advertisement at the non-active time and the behavioral characteristics of the advertisement at the active time.

2. The method of claim 1, wherein taking the at least one action comprises subjecting the advertisement to a greater degree of scrutiny regarding whether the advertisement is malicious than if it had been determined that there is not a difference between the behavioral characteristics of the advertisement at the non-active time and the behavioral characteristics of the advertisement at the active time.

3. The method of claim 1, wherein taking at least one action comprises at least temporarily removing the advertisement from being available for serving to users.

4. The method of claim 1, wherein taking at least one action comprises testing the advertisement with respect to whether it is malicious using a virtual machine.

5. The method of claim 1, comprising:
using one or more computers, based at least the first set of information, and prior to making the advertisement available for serving to users, determining a level of risk that the advertisement is malicious; and
using one or more computers, subjecting the advertisement to a degree of scrutiny as to whether the advertisement is malicious based at least on the determined level of risk.

6. The method of claim 5, wherein subjecting the advertisement to a degree of scrutiny as to whether the advertisement is malicious based at least on the determined level of risk includes, for a higher level of risk, more frequent testing of the advertisement after the advertisement is made available for serving.

7. The method of claim 5, wherein determining a level of risk that the advertisement is malicious is based on the first set of information and other characteristics associated with the advertisement or a provider of the advertisement.

8. The method of claim 1, comprising taking into account the type and degree of difference in determining a degree of risk that the advertisement is malicious.

9. The method of claim 1, wherein advertisement serving is facilitated using an exchange that connects networks of advertisers and networks of publishers.

10. A system comprising:
one or more server computers connected to the Internet; and
one or more databases connected to the one or more server computers;
wherein the one or more server computers are for:
testing the advertisement at a non-active time to obtain a first set of information identifying a first set of behavioral characteristics associated with the advertisement, a non-active time being a time at which the advertisement is not available for serving to users;
storing the first set of information in at least one of the one or more databases;
testing the advertisement at an active time to obtain a second set of information identifying a second set of behavioral characteristics associated with the advertisement, an active time being a time at which the advertisement is available for serving to users;
storing the second set of information in at least one of the one or more databases;
comparing the first set of information with the second set of information to determine at least whether there is a difference between the behavioral characteristics of the advertisement at the non-active time and the behavioral characteristics of the advertisement at the active time;
storing a third set of information at least identifying the determination of at least
whether there is a difference in at least one of the one or more databases; and
if it is determined that there is a difference between the behavioral characteristics of the advertisement at the non-active time and the behavioral characteristics of the advertisement at the active time, then conducting at least one action reflecting a determination that the advertisement is more likely to be malicious than if it had been determined that there is not a difference between the behavioral characteristics of the advertisement at the non-active time and the behavioral characteristics of the advertisement at the active time.

11. The system of claim 10, wherein at least one of the one or more server computers are connected to an exchange.

12. The system of claim 10, further comprising an exchange that facilitates serving of advertisements to users, wherein the exchange connects publisher networks with advertiser networks.

13. The system of claim 10, wherein taking the at least one action comprises subjecting the advertisement to a greater degree of scrutiny regarding whether the advertisement is malicious than if it had been determined that there is not a difference between the behavioral characteristics of the advertisement at the non-active time and the behavioral characteristics of the advertisement at the active time.

14. The system of claim 10, wherein taking at least one action comprises at least temporarily removing the advertisement from being available for serving to users.

15. The system of claim 10, wherein taking at least one action comprises testing the advertisement with respect to whether it is malicious using a virtual machine.

16. The system of claim 10, wherein the one or more server computers are further for:
based at least the first set of information, and prior to making the advertisement available for serving to users, determining a level of risk that the advertisement is malicious; and
subjecting the advertisement to a degree of scrutiny as to whether the advertisement is malicious based at least in part on the determined level of risk.

17. The system of claim 16, wherein subjecting the advertisement to a degree of scrutiny as to whether the advertisement is malicious based at least on the determined level of risk includes, for a higher level of risk, more frequent testing of the advertisement after the advertisement is made available for serving.

18. The system of claim 16, wherein determining a level of risk that the advertisement is malicious is based on the first set of information and other characteristics associated with the advertisement.

19. The method of claim 18, wherein determining a level of risk that the advertisement is malicious is based on the first set of information and other characteristics associated with the advertisement, and wherein the other characteristics include reliability of an entity at least partially responsible for providing the advertisement.

20. A non-transitory computer readable medium containing instructions configured to execute a method, the method comprising:

testing an advertisement at a non-active time to obtain a first set of information identifying a first set of behavioral characteristics associated with the advertisement, a non-active time being a time at which the advertisement is not available for serving to users;

storing the first set of information;

based at least on the first set of information, and prior to making the advertisement available for serving to users, determining a level of risk that the advertisement is malicious;

subjecting the advertisement to a degree of scrutiny as to whether the advertisement is malicious based at least on the determined level of risk;

testing the advertisement at an active time to obtain a second set of information identifying a second set of behavioral characteristics associated with the advertisement, an active time being a time at which the advertisement is available for serving to users;

storing the second set of information;

comparing the first set of information with the second set of information to determine at least whether there is a difference between the behavioral characteristics of the advertisement at the non-active time and the behavioral characteristics of the advertisement at the active time;

storing a third set of information at least identifying the determination of at least whether there is a difference; and if it is determined that there is a difference between the behavioral characteristics of the advertisement at the non-active time and the behavioral characteristics of the advertisement at the active time, then conducting at least one action reflecting a determination that the advertisement is more likely to be malicious than if it had been determined that there is not a difference between the behavioral characteristics of the advertisement at the non-active time and the behavioral characteristics of the advertisement at the active time;

wherein taking the at least one action comprises subjecting the advertisement to a greater degree of scrutiny regarding whether the advertisement is malicious than if it had been determined that there is not a difference between the behavioral characteristics of the advertisement at the non-active time and the behavioral characteristics of the advertisement at the active time.

\* \* \* \* \*